United States Patent
Seki (10) Patent No.: US 11,965,558 B2
(45) Date of Patent: Apr. 23, 2024

(54) SEALING DEVICE (71) Applicant: NOK CORPORATION, Tokyo (JP)

(72) Inventor: Masahiro Seki, Fukushima (JP)

(73) Assignee: NOK CORPORATION, Tokyo (JP)

(*) Notice: Subject to any disclaimer, the term of this patent is extended or adjusted under 35 U.S.C. 154(b) by 177 days.

(21) Appl. No.: 17/639,977

(22) PCT Filed: Jun. 22, 2020

(86) PCT No.: PCT/JP2020/024349
§ 371 (c)(1),
(2) Date: Mar. 3, 2022

(87) PCT Pub. No.: WO2021/059626
PCT Pub. Date: Apr. 1, 2021

(65) Prior Publication Data
US 2022/0333649 A1  Oct. 20, 2022

(30) Foreign Application Priority Data
Sep. 24, 2019 (JP) .................................. 2019-173081

(51) Int. Cl.
F16C 33/78 (2006.01)
B60B 27/00 (2006.01)
F16C 33/80 (2006.01)

(52) U.S. Cl.
CPC ........ *F16C 33/7883* (2013.01); *F16C 33/805* (2013.01); *B60B 27/0073* (2013.01)

(58) Field of Classification Search
CPC .... F16C 33/7883; F16C 33/80; F16C 33/805; F16C 2326/02; B60B 27/0073
See application file for complete search history.

(56) References Cited

U.S. PATENT DOCUMENTS 3,963,248 A  6/1976  Bainard
4,434,985 A  3/1984  Sonnerat
(Continued)

FOREIGN PATENT DOCUMENTS

BR  102016007749  11/2016
CN     103987976    8/2014
(Continued)

OTHER PUBLICATIONS

Notice of Reasons for Refusal received in Japan Application No. 2021-548342, dated Oct. 25, 2022.
(Continued)

*Primary Examiner* — Alan B Waits
(74) *Attorney, Agent, or Firm* — Greenblum & Bernstein, P.L.C.

(57) ABSTRACT

A sealing device has two sealing members. A first sealing member has a cylindrical mounted part adapted to be mounted to an outer member and an annular part extending radially inward from the cylindrical mounted part toward the inner member. A second sealing member has a sleeve adapted to be mounted to an inner member, a flange extending radially outward from the sleeve, and a cylindrical protruding portion made from an elastic material extending along the axial direction from the flange. Multiple retaining protrusions are formed on the inner peripheral surface of the cylindrical mounted part of the first sealing member are arranged at intervals in a circumferential direction. On the outer peripheral surface of the cylindrical protruding portion of the second sealing member, circumferential groove extending continuously in a circumferential direction is formed, within which the retaining protrusions are placed.

6 Claims, 8 Drawing Sheets

(56) References Cited

U.S. PATENT DOCUMENTS

| | | | |
|---|---|---|---|
| 4,981,303 A | 1/1991 | Matsushima et al. | |
| 5,201,529 A | 4/1993 | Heinzen | |
| 6,170,992 B1* | 1/2001 | Angelo | F16C 33/805 |
| | | | 384/477 |
| 2004/0086212 A1 | 5/2004 | Ohtsuki et al. | |
| 2015/0117805 A1 | 4/2015 | Takayama et al. | |
| 2018/0258995 A1* | 9/2018 | Mitsuishi | F16C 33/7883 |

FOREIGN PATENT DOCUMENTS

| | | |
|---|---|---|
| CN | 108026974 | 5/2018 |
| DE | 10 2017 101 821 | 8/2017 |
| DE | 10 2016 207 227 | 11/2017 |
| EP | 0 116 721 | 8/1984 |
| IT | TO 20000248 | 9/2001 |
| JP | 2001-289254 | 10/2001 |
| JP | 2002-333035 | 11/2002 |
| JP | 2008-267423 | 11/2008 |
| JP | 2009-197884 | 9/2009 |
| JP | 2010-185465 | 8/2010 |
| JP | 2014-31877 | 2/2014 |
| JP | 2017-15213 | 1/2017 |
| JP | 2017-57930 | 3/2017 |
| JP | 2017-67101 | 4/2017 |
| JP | 2019-138457 | 8/2019 |

OTHER PUBLICATIONS

Japan Office Action issued in JP Application No. 2021-548342, dated Apr. 4, 2023.

International Search Report issued in International Patent Application No. PCT/JP2020/024349, dated Aug. 18, 2020, along with an English translation thereof.

China Office Action received in CN Application No. 202080066409.7, dated Sep. 1, 2023.

* cited by examiner

OUTBOARD SIDE

INBOARD SIDE

Fig. 10

SEALING DEVICE

TECHNICAL FIELD

The present invention relates to sealing devices.

BACKGROUND ART

Patent Document 1 discloses sealing devices adapted to be deployed in rolling bearings. Each sealing device disclosed in Patent Document 1 has two annular sealing plates mounted on an inner member and an outer member of a rolling bearing, respectively. In the sealing device disclosed in FIG. 6 of Patent Document 1, the sealing plates have annular protrusions that engage each other for preventing separation of the sealing plates.

Patent Document 2 discloses combination seal rings that are adapted to be deployed in rolling bearings. Each combination seal ring disclosed in Patent Document 2 has a slinger and a seal ring mounted on the inner race and outer race of the rolling bearing, respectively. In the sealing device disclosed in FIGS. 5 and 6 of Patent Document 2, a ridge formed in the slinger is engaged with a groove formed in the seal ring to prevent the slinger from being separated from the seal ring.

BACKGROUND DOCUMENT(S)

Patent Document(s)

Patent Document 1: JP-A-2001-289254
Patent Document 2: JP-A-2010-185465

SUMMARY OF THE INVENTION

In a sealing device that is deployed in a rolling bearing and has a combination of two sealing members, it may be desirable to prevent separation of the sealing members as described above. However, even in this case, it is preferable to assemble the sealing device by combining the seal members easily. In addition, it is preferable that there is little damage to the sealing members when they are combined.

Furthermore, with regard to the type of sealing device described, a need exists to enhance prevention of ingress of foreign matter (e.g., water (including muddy or salty water)) into the interior of the sealed object (i.e., the bearing) when the sealing device is used in an environment with a lot of foreign matter. In addition, in the event that foreign matter does enter the sealing device, a need exists to enable rapid discharge of the foreign matter.

Accordingly, the present invention provides a sealing device that can prevent or reduce separation of two sealing members, can be easily assembled by combining the sealing members with less damage to the sealing members, can reduce ingress of foreign matter, and has a superior ability to discharge foreign matter that does enter the sealing device.

In accordance with an aspect of the present invention, there is provided a sealing device disposed between an inner member and an outer member that rotate relative to each other, the sealing device acting to seal a gap between the inner member and the outer member, the sealing device including a first sealing member including a cylindrical mounted part adapted to be mounted to the outer member, and an annular part extending radially inward from the cylindrical mounted part toward the inner member; and a second sealing member including a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member. The cylindrical mounted part of the first sealing member includes an inner peripheral surface on which multiple retaining protrusions made from an elastic material are formed circumferentially, the retaining protrusions being arranged at intervals in a circumferential direction. The cylindrical protruding portion of the second sealing member includes an outer peripheral surface on which a circumferential groove extending continuously in a circumferential direction is formed, the multiple retaining protrusions of the first sealing member being placed within the circumferential groove. The cylindrical protruding portion of the second sealing member includes an end portion opposite to the flange, the end portion including an outer peripheral edge including an end protrusion protruding radially further outward than the circumferential groove, the end protrusion extending continuously in a circumferential direction.

According to this aspect, the multiple retaining protrusions intermittently formed on the inner peripheral surface of the cylindrical mounted part of the first sealing member are fitted in the circumferential groove formed on the outer peripheral surface of the cylindrical protruding portion of the second sealing member, so that the first sealing member and the second sealing member are combined to assembly the sealing device. After assembly, the retaining protrusions are caught in the circumferential groove to prevent separation of the two sealing members. The multiple retaining protrusions formed from an elastic material are spaced apart in the circumferential direction, so that, the resistance force of the retaining protrusions is smaller when combining the first sealing member and the second sealing member, in comparison with a case in which a single retaining protrusion extends continuously in the circumferential direction. Accordingly, the task of assembling the sealing device is easy, and there is little damage to the sealing members when combining the first sealing member and the second sealing member. Furthermore, even if foreign matter enters the circumferential groove on the outer peripheral surface of the cylindrical protruding portion from the outside, the end protrusion formed in the cylindrical protruding portion prevents much of the foreign matter from entering, thus inhibiting further entry of the foreign matter. In addition, since arcuate clearances are provided between the multiple retaining projections spaced apart in the circumferential direction, foreign matter that has entered the space between the annular part of the first sealing member and the flange of the second sealing member is likely to be discharged through arcuate clearances.

DESCRIPTION OF EMBODIMENTS

Hereinafter, with reference to the accompanying drawings, various embodiments according to the present invention will be described. It is of note that the drawings are not necessarily to scale, and certain features may be exaggerated or omitted.

Figure 1:
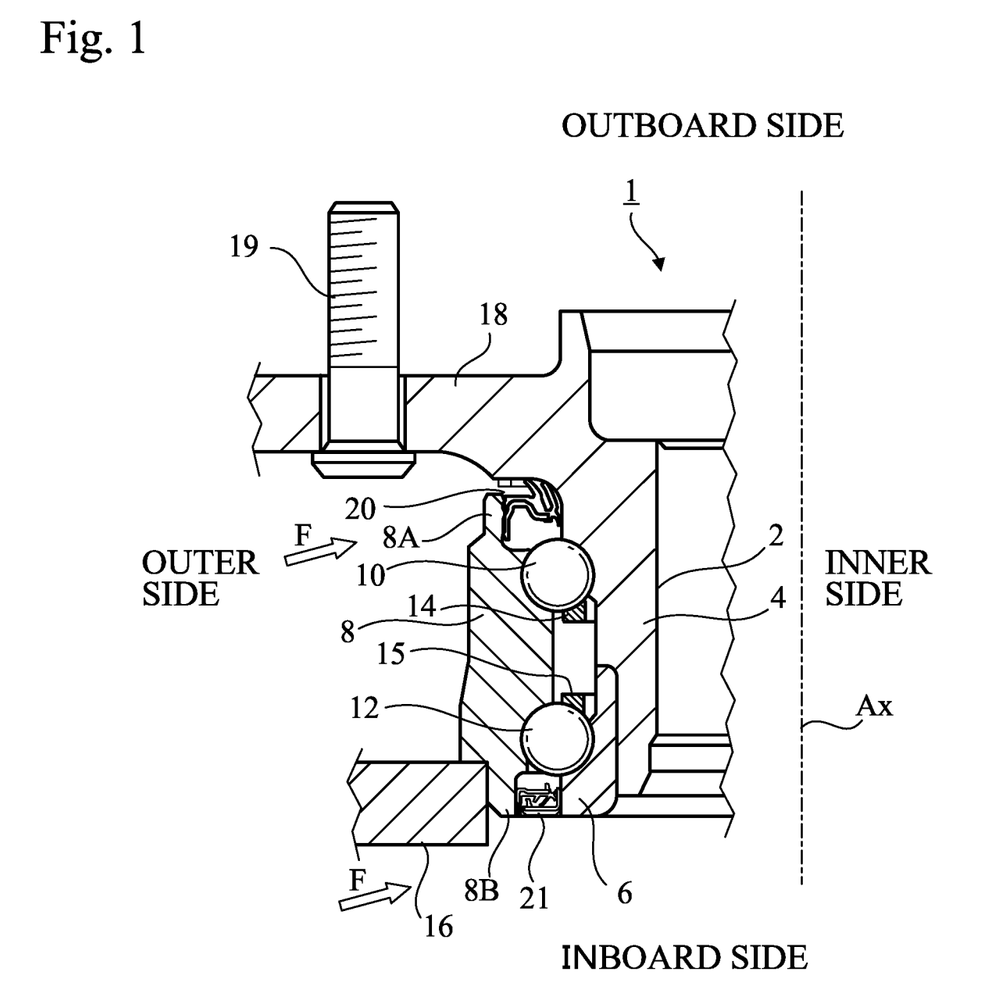
FIG. 1 is a partial cross-sectional view of an example of a rolling bearing in which the sealing device according to any one of embodiments of the present invention is used.

FIG. 1 shows an automotive vehicle hub bearing, which is an example of a rolling bearing in which a sealing device according to any one of the embodiments of the present invention is used. The present invention is not limited to hub bearings, and is applicable to other types of rolling bearings. In the following description, the hub bearing is a ball bearing. Again, the present invention is not limited to ball bearings, and is applicable to other types of rolling bearings, such as roller bearings and needle bearings, and other types of rolling elements. The present invention is also applicable to rolling bearings used in machines other than automotive vehicles.

The hub bearing 1 includes a hub 4 (inner member) that has a hole 2 into which a spindle (not shown) is inserted, an inner race 6 (inner member) attached to the hub 4, an outer race 8 (outer member) located outside of the hub 4 and the inner race 6, multiple balls 10 arranged in a row between the hub 4 and the outer race 8, multiple balls 12 arranged in a row between the inner race 6 and the outer race 8, and multiple retainers 14 and 15 that retain the balls in place.

Whereas the outer race 8 remains stationary, the hub 4 and the inner race 6 rotate with the spindle.

In FIG. 1, the central axis Ax common to the spindle and hub bearing 1 extends in a vertical direction. In FIG. 1, relative to the central axis Ax only the left part is shown; and although not shown in detail, in FIG. 1 the upper side corresponds to the outer side (outboard side) of the automotive vehicle on which wheels are arranged, while the lower side corresponds to the inner side (inboard side) on which differential gears are arranged. In FIG. 1, the outer side and the inner side are each shown in their respective radial directions.

The outer race 8 of the hub bearing 1 is fixed to the hub knuckle 16. The hub 4 has an outboard side flange 18 that extends radially further outward than the outer race 8. A wheel can be attached to the outboard side flange 18 by hub bolts 19.

A sealing device 20 that seals a gap between the outer race 8 and the hub 4 is located close to the end of the outer race 8 on the outboard side, and inside the end of the outer race 8 on the inboard side. Another sealing device 21 that seals a gap between the outer race 8 and the inner race 6 is located inside the end of the inner side of the outer race 8. The sealing devices 20 and 21 prevent outflow of grease, i.e., lubricant from the inside of the hub bearing 1, and prevent entry of foreign matter (water, including muddy water or salt water) into the interior of the hub bearing 1 from the outside.

In FIG. 1, arrows F indicate an example direction of an exterior flow of foreign matter.

The sealing device 20 is located between the rotatable hub 4 and the cylindrical end portion 8A on the outboard side of the stationary outer race 8 of the hub bearing 1, and seals the gap between the outer race 8 and the hub 4. The sealing device 21 is located between the rotatable inner race 6 and the end portion 8B on the inboard side of the outer race 8 of the hub bearing 1, and seals the gap between the outer race 8 and the inner race 6.

Figure 2:
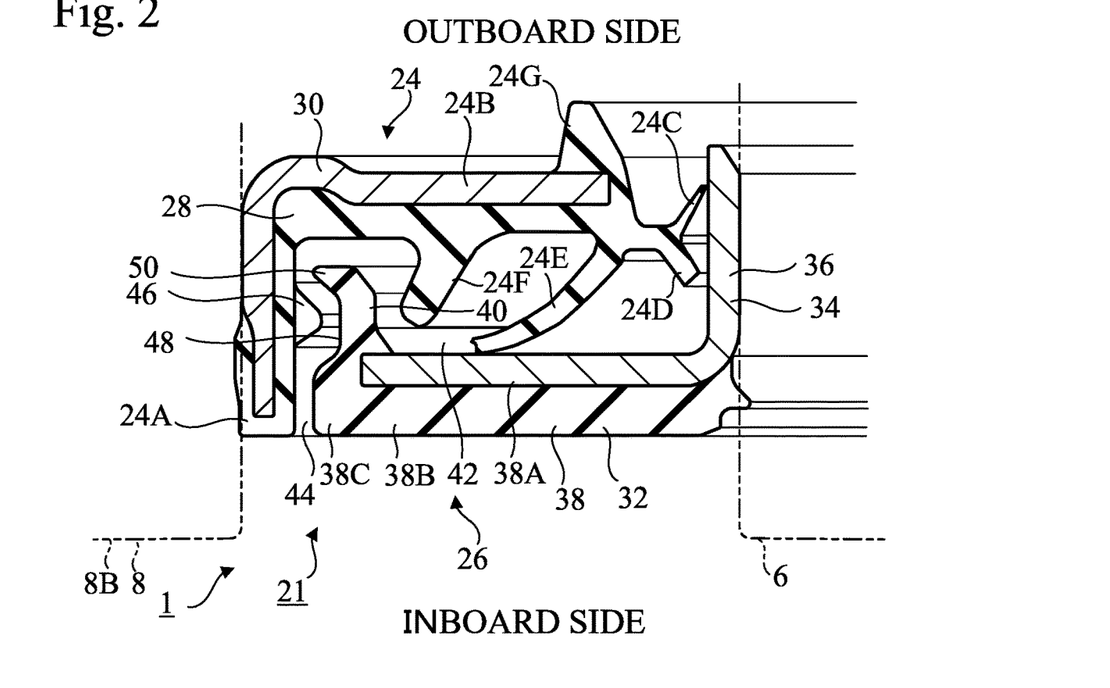
FIG. 2 is a partial cross-sectional view of a sealing device according to an embodiment.

As shown in FIG. 2, the sealing device 21 is provided in a gap between the end portion 8B on the inboard side of the outer race 8 of the hub bearing 1 and the inner race 6 of the hub bearing 1. The sealing device 21 is annular in shape. In FIG. 2 only the left part of the sealing device 21 is shown.

As will be apparent from FIG. 2, the sealing device 21 has a composite structure and includes a first sealing member 24 and a second sealing member 26.

The first sealing member 24 is a stationary sealing member that is attached to the outer race 8 and does not rotate. The first sealing member 24 has a composite structure and includes an elastic ring 28 and a rigid ring 30. The elastic ring 28 is made from an elastic material such as an elastomer. The rigid ring 30 is made from a rigid material such as a metal and reinforces the elastic ring 28. As viewed in cross section, the rigid ring 30 is substantially L-shaped. A part of the rigid ring 30 is embedded in the elastic ring 28 and is in close contact with the elastic ring 28.

The first sealing member 24 has a cylindrical mounted part 24A, an annular part 24B, lips 24C, 24D, 24E, and 24F, and a cylindrical protrusion 24G.

The cylindrical mounted part 24A is adapted to be mounted to the outer race 8. For example, the cylindrical mounted part 24A is engaged by interference fit, namely, is press-fitted into the end portion 8B of the outer race 8. The annular part 24B, which has a circular annular shape, is located radially inside the cylindrical mounted part 24A and extends radially inward toward the inner race 6 from the cylindrical mounted part 24A. The cylindrical mounted part 24A and the annular part 24B are formed from the rigid ring 30 and the elastic ring 28.

The lips 24C, 24D, and 24E extend from the inner end of the annular part 24B toward the second sealing member 26. The lip 24F extends from a middle portion of the annular part 24B toward the second sealing member 26. The cylindrical protrusion 24G extends from the inner end of the annular part 24B toward the outboard side along the axial direction of the sealing device 21. The lips 24C, 24D, 24E, and 24F and the cylindrical protrusion 24G are formed from the elastic ring 28.

The second sealing member 26 may also be referred to as a slinger, that is, a rotational sealing member. The second sealing member 26 is mounted to the inner race 6, rotates together with the inner race 6, and acts to deflect exterior splashing of foreign matter.

In this embodiment, the second sealing member 26 also has a composite structure and includes an elastic ring 32 and a rigid ring 34. The rigid ring 34 is made from a rigid material such as a metal. As viewed in cross section, the rigid ring 34 is substantially L-shaped.

The second sealing member 26 includes a sleeve 36, a flange 38, and a cylindrical protruding portion 40.

The sleeve 36 is constituted of only the rigid ring 34 and is adapted to be mounted to the inner race 6. More specifically, an end portion of the inner race 6 is engaged by interference fit, namely, is press-fitted into the sleeve 36.

The flange 38 extends radially outward from the sleeve 36 and faces the annular part 24B of the first sealing member 24. The flange portion 38 is a flat plate and lies on a plane that is perpendicular to the axis of the sleeve 36. The flange 38 is constituted of the rigid ring 34 and the elastic ring 32. In other words, the flange 38 has a flange rigid portion 38A consisted of the rigid ring 34 and a flange elastic portion 38B consisted of the elastic ring 32. The flange elastic portion 38B is adhered to the entirety of the surface (inboard side surface) of the flange rigid portion 38A on the side opposite the sleeve 36, and is also adhered to the outer peripheral end surface of the flange rigid portion 38A.

The cylindrical protruding portion 40 extends from the flange 38 along the axial direction of the sealing device 21 and is located radially inside the cylindrical mounted part 24A of the first sealing member 24 and radially outside the sleeve 36. The cylindrical protruding portion 40 is constituted of the elastic ring 32 and is integrally coupled to the outer edge 38C of the flange elastic portion 38B.

In this embodiment, the flange elastic portion 38B can be used to measure the rotational speed of the inner race 6. More specifically, the elastic ring 32 is formed from an elastomer material that contains a magnetic metal powder and a ceramic powder, and has a large number of S poles and N poles provided by the magnetic metal powder. In the flange elastic portion 38B, the S poles and N poles are alternately arranged at equiangular intervals in a circumferential direction. The angle of rotation of the flange elastic portion 38B is measured by use of a magnetic rotary encoder (not shown). Since the material of the elastic ring 32 contains a metal powder, it has a higher degree of hardness than that of conventional elastomer materials and thus is not readily susceptible to damage by foreign matter.

The lip 24C of the first sealing member 24 is a radial lip that extends radially inward and the outboard side from the inner end of the annular part 24B. The lip 24C extends toward the sleeve 36 of the second sealing member 26. The lip 24C is a grease lip having a primary role in preventing outflow of the lubricant from the inside of the hub bearing 1. The distal end of the lip 24C may be in contact with the sleeve 36, but need not be in contact with the sleeve 36.

The lip 24D is a radial that extends radially inward and laterally from the inner end of the annular part 24B. The lip 24D also extends toward the sleeve 36 of the second sealing member 26. The lip 24D is a dust lip having a primary role in preventing exterior inflow of foreign matter into the hub bearing 1. The distal end of the lip 24D may be in contact with the sleeve 36, but need not be in contact with the sleeve 36.

The lip 24E is a side lip that extends radially outward and the inboard side from the inner end of annular part 24B. The side lip 24E extends toward the flange 38 of the second sealing member 26. The side lip 24E also has a primarily primary role in preventing the inflow of foreign matter from the outside into the hub bearing 1. The distal end of the lip 24E may be in contact with the flange 38, but need not be in contact with the flange 38.

To improve sealing ability, the distal ends of the grease lip 24C, the dust lip 24D, and the side lip 24E are preferably in contact with the second sealing member 26. However, in order to reduce the torque exerted on the second sealing member 26 and thus the inner race 6, the distal ends of the grease lip 24C, the dust lip 24D, and the side lip 24E are preferably not in contact with the second sealing member 26.

The annular lip 24F extends from the middle of the annular part 24B toward the second sealing member 26. When the sealing device 21 is in use, the distal end of the lip 24F is not in contact with the second sealing member 26. The lip 24F is a labyrinth lip that complicates the internal shape of the space 42 between the annular part 24B of the first sealing member 24 and the flange 38 of the second sealing member 26, making it difficult for foreign matter to enter toward the side lip 24E located radially inside the lip 24F. The labyrinth lip 24F is located radially inside the cylindrical protruding portion 40 of the second sealing member 26.

A circular annular clearance 44 is provided between the distal end on the inboard side of the cylindrical mounted part 24A of the first sealing member 24 and the outer edge 38C of the flange 38 of the second sealing member 26. Foreign matter may enter through the clearance 44 into the space 42 between the annular part 24B of the first sealing member 24 and the flange 38 of the second sealing member 26. However, foreign matter that does enter into the space 42 can also be discharged through the clearance 44.

Figure 3:
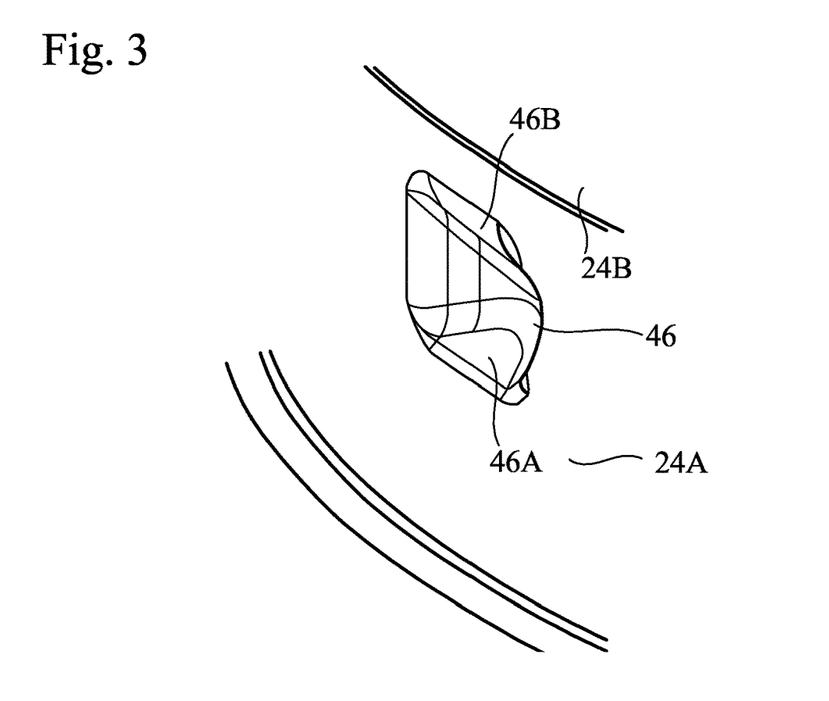
FIG. 3 is a perspective view of a retaining protrusion of the sealing device according to the embodiment.
Figure 4:
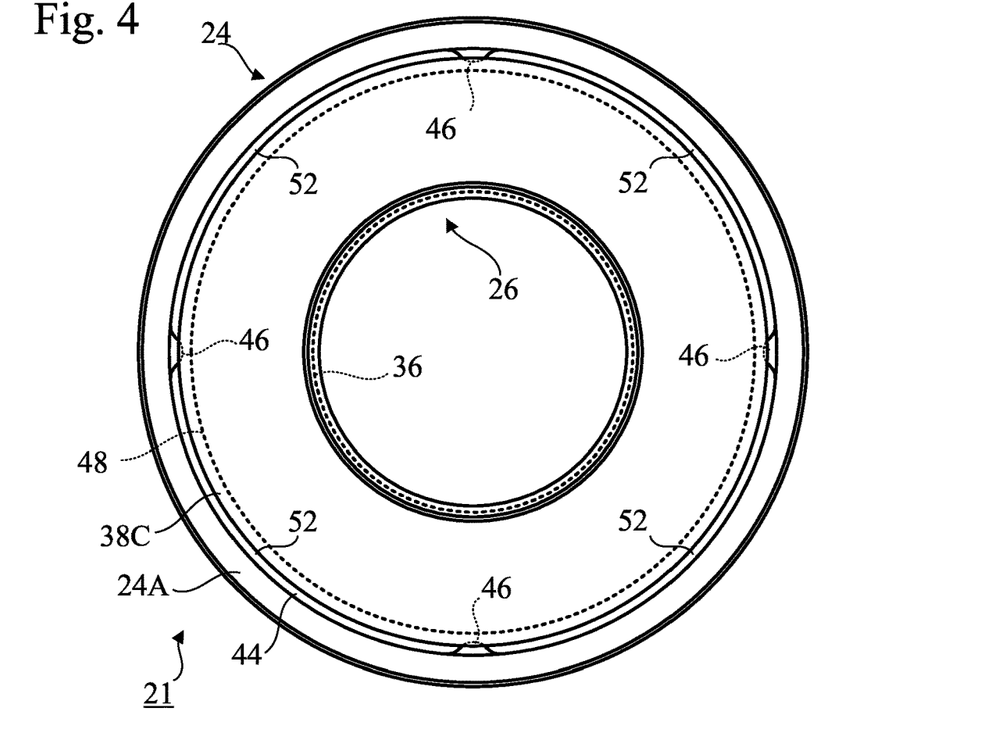
FIG. 4 is a bottom view of the sealing device according to the embodiment.

As shown in FIGS. 2 to 4, multiple retaining protrusions 46 formed from the elastic material are formed on the cylindrical inner peripheral surface of the cylindrical mounted part 24A of the first sealing member 24 and are arranged at intervals in a circumferential direction. As is apparent from FIG. 4, each retaining protrusions 46, when viewed along the axial direction of the sealing device 21, overlaps the annular clearance 44. Arcuate clearances 52 are provided between the multiple retaining protrusions 46 spaced apart from each other in the circumferential direction.

In FIG. 4, the number of retaining protrusions 46 is four, but the number of retaining protrusions 46 is not limited to FIG. 4 and can be two or more. Preferably, the number of retaining projections 46 is three or more.

On the outer peripheral surface of the cylindrical protruding portion 40 of the second sealing member 26, a circumferential groove 48 is formed which extends continuously in a circumferential direction. The multiple retaining protrusions 46 of the first sealing member 24 are disposed within the circumferential groove 48.

An end protrusion 50 is formed on the outer peripheral edge of the end portion opposite to the flange 38 of the cylindrical protruding portion 40 of the second sealing member 26, and projects radially outside the circumferential groove 48. The end protrusion 50 extends continuously in a circumferential direction. The end protrusion 50 defines one end of the circumferential groove 48, and the outer edge 38C of the flange 38 defines the other end of the circumferential groove 48.

The multiple retaining projections 46 inhibit separation of the combined first and second sealing members 24 and 26. Specifically, the multiple retaining protrusions 46 intermittently formed on the inner peripheral surface of the cylindrical mounted part 24A of the first sealing member 24 are fitted in the circumferential groove 48 formed on the outer peripheral surface of the cylindrical protruding portion 40 of the second sealing member 26, so that the first sealing member 24 and the second sealing member 26 are combined to assembly the sealing device 21. After assembly, the retaining protrusions 46 are caught in the circumferential groove 48 to prevent separation of the sealing members 24 and 26.

Thus, the retaining protrusions 46 can be caught in the circumferential groove 48 to prevent separation of the sealing members 24 and 26. Accordingly, the grease lip 24C and the dust lip 24D of the first sealing member 24 do not need to tighten the sleeve 36 of the second sealing member 26. In other words, if the grease lip 24C and the dust lip 24D are pressed against the sleeve 36 with a strong force, separation of the sealing members 24 and 26 can be restricted.

On the other hand, in order to reduce the torque exerted on the second sealing member 26 and thus the inner race 6, it is preferable that the grease lip 24C and the dust lip 24D be not in contact with the sleeve 36. Even in this case, separation of the seal members 24 and 26 is prevented by the retaining protrusions 46 being hooked in the circumferential groove 48.

Figure 5:
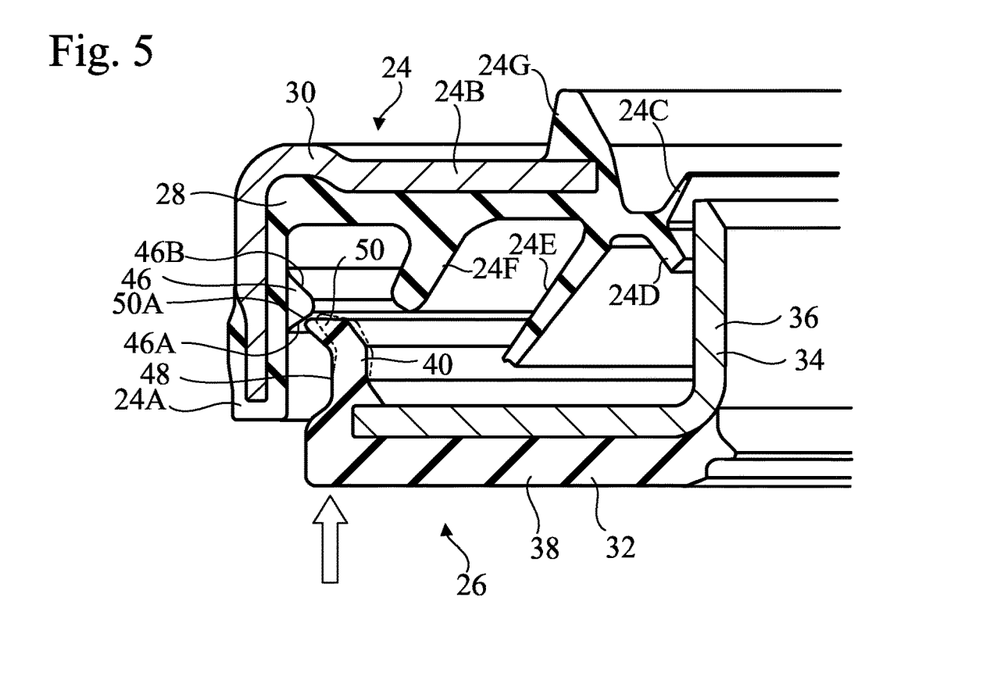
FIG. 5 is a partial cross-sectional view of the sealing device according to the embodiment during assembly.

FIG. 5 is a partial cross-sectional view of the sealing device 21 during assembly, and the arrow in FIG. 5 indicates the direction along which the second sealing member 26 is brought closer to the first sealing member 24.

The multiple retaining protrusions 46 formed from an elastic material are spaced apart in the circumferential direction, so that, the resistance force of the retaining protrusions 46 is smaller when combining the first sealing member 24 and the second sealing member 26, in comparison with a case in which a single retaining protrusion extends continuously in the circumferential direction. Accordingly, the task of assembling the sealing device 21 is easy, and there is little damage to the sealing members 24 and 26 (e.g., the retaining protrusions 46 and the end protrusion 50) when combining the first sealing member 24 and the second sealing member 26.

Figure 6A:
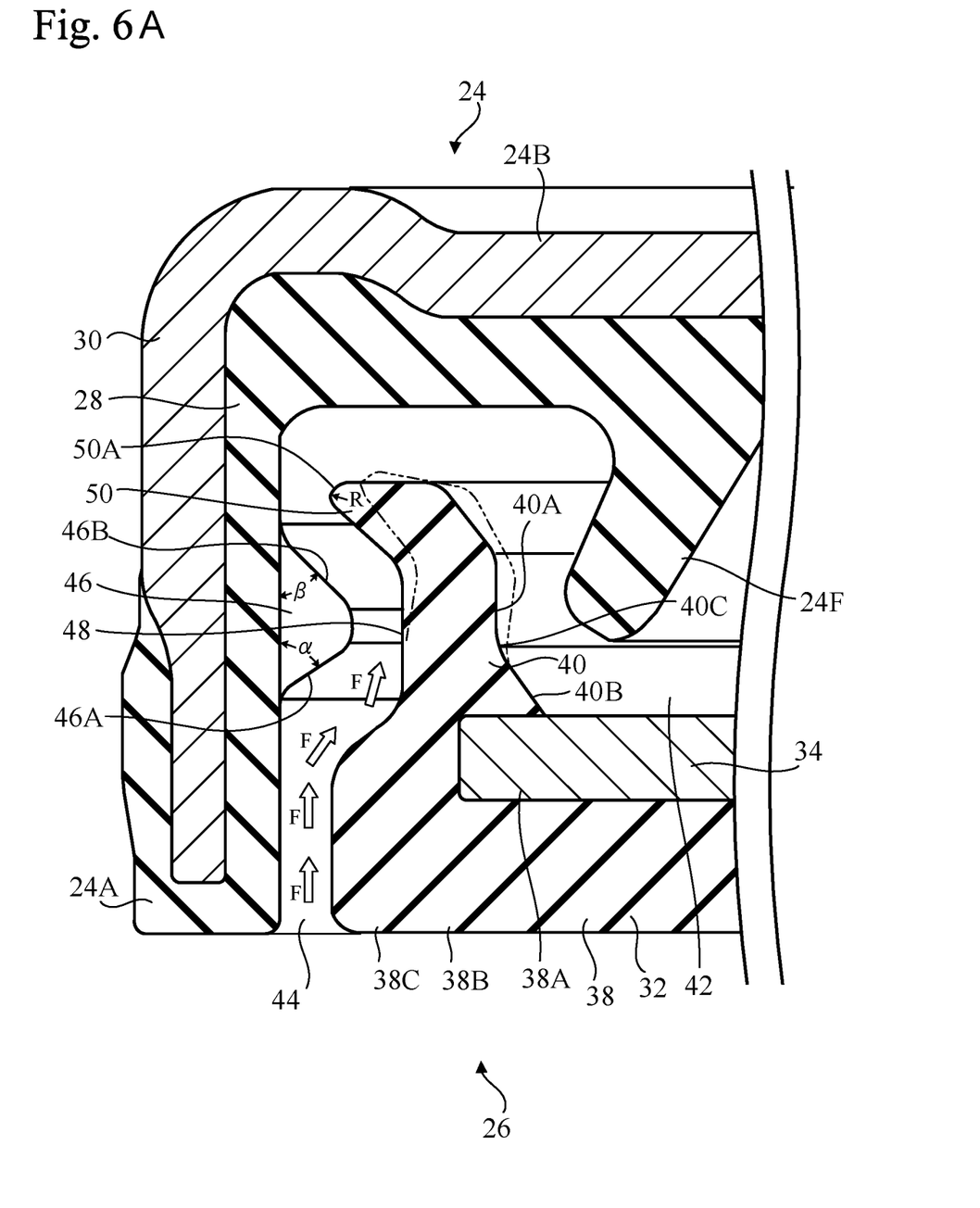
FIG. 6A is a partial enlarged cross-sectional view of the sealing device according to the embodiment.

FIG. 6A is a partial enlarged cross-sectional view of the sealing device 21, and arrows F in FIG. 6A indicate an example direction of an exterior flow of foreign matter. Even if foreign matter enters the circumferential groove 48 on the outer peripheral surface of the cylindrical protruding portion 40 from the outside, the end protrusion 50 formed in the cylindrical protruding portion 40 prevents much of the foreign matter from entering, thus inhibiting further entry of the foreign matter. In addition, since arcuate clearances 52 are provided between the multiple retaining projections 46 spaced apart in the circumferential direction (see FIG. 4), foreign matter that has entered the space 42 between the annular part 24B of the first sealing member 24 and the flange 38 of the second sealing member 26 is likely to be discharged through arcuate clearances 52.

The retaining protrusions 46 of the first sealing member 24 and the circumferential groove 48 of the second sealing member 26 are located closer to the annular part 24B of the first sealing member 24 than the annular clearance 44. The circumferential groove 48 is formed radially inside the annular clearance 44. When the inner race 6 rotates as in the embodiment, the second sealing member 26 mounted on the inner race 6 also rotates, and foreign matter that has entered the circumferential groove 48 formed on the outer peripheral surface of the cylindrical protruding portion 40 of the second sealing member 26 is blown out. Since the circumferential groove 48 is formed radially inside the annular clearance 44, foreign matter blown out from the circumferential groove 48 can pass through the annular clearance 44 to the outside of the sealing device 21 easily.

As shown in FIG. 5, when assembling the sealing device 21 by combining the first sealing member 24 and the second sealing member 26, the end protrusion 50 formed on the cylindrical protruding portion 40 of the second sealing member 26 is brought into contact with the retaining protrusions 46 formed on the inner peripheral surface of the cylindrical mounted part 24A of the first sealing member 24. The cylindrical protruding portion 40 including the end protrusion 50 is constituted of only an elastic material and is not reinforced with a rigid material. Therefore, the cylindrical protruding portion 40 is flexible and the end protrusion 50 of the cylindrical protruding portion 40 easily passes over the retaining protrusions 46. Accordingly, the first sealing member 24 and the second sealing member 26 can be easily combined.

Figure 7:
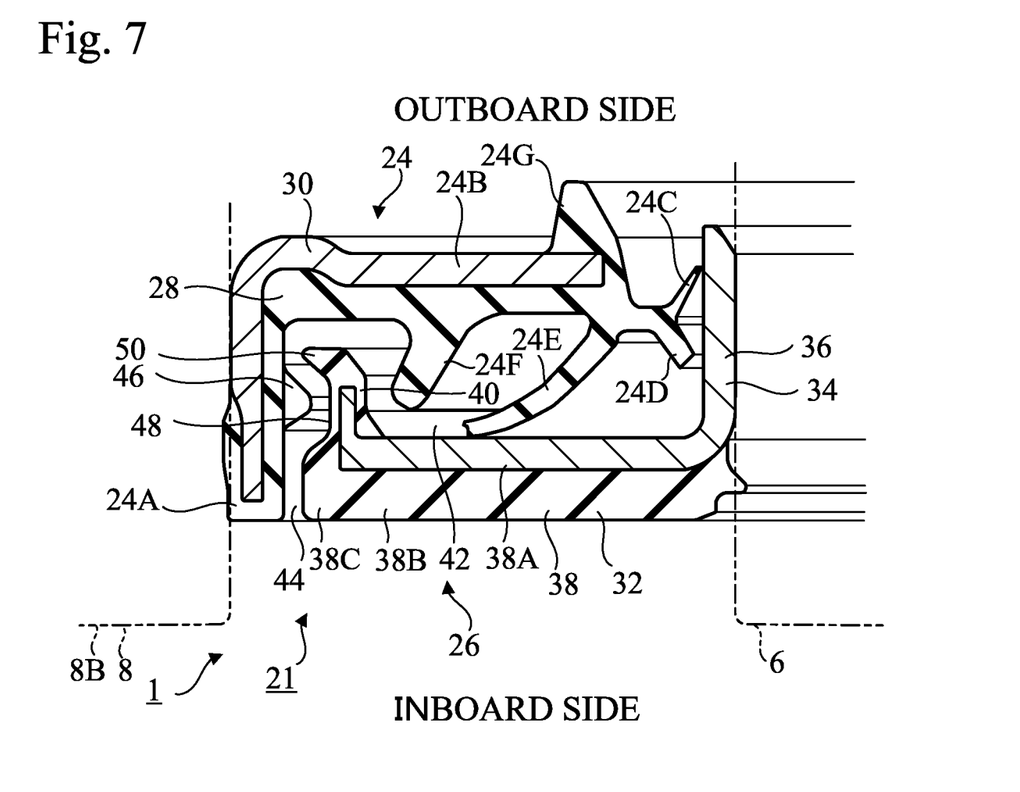
FIG. 7 is a partial cross-sectional view of a sealing device according to a modification of the embodiment.

In this embodiment, the entirety of the cylindrical protruding portion 40 is made from only elastic material, but the proximal end of the cylindrical protruding portion 40 may be reinforced with a rigid material, as in a modification shown in FIG. 7. However, even in the modification shown in FIG. 7, the end portion of the cylindrical protruding portion 40 opposite to the flange 38, including the end protrusion 50, is formed only from the elastic material. Therefore, the end protrusion 50 and the distal end of the cylindrical protruding portion 40 located radially inside the end protrusion 50 are not reinforced with a rigid material, and therefore they are flexible, so that the end protrusion 50 of the cylindrical protruding portion 40 easily passes over the retaining protrusions 46. Therefore, the first sealing member 24 and the second sealing member 26 can be easily combined.

As shown in FIG. 6A, the inner peripheral surface of the cylindrical protruding portion 40 has a cylindrical surface 40A and a truncated conical surface 40B adjacent to the cylindrical surface 40A. The truncated conical surface 40B is located closer to the flange 38 than the cylindrical surface 40A. The truncated conical surface 40B has a diameter that increases as the distance from flange 38 increases.

According to the shape of the inner peripheral surface of the cylindrical protruding portion 40, the cylindrical protruding portion 40 is likely to be bent radially inward near the boundary 40C between the truncated conical surface 40B located closer to the flange 38 and the cylindrical surface 40A located farther from the flange 38. The phantom lines in FIGS. 5 and 6 show the contours of the bent cylindrical protruding portion 40. When the first sealing member 24 and the second sealing member 26 are combined to assemble the sealing device 21, the end protrusion 50 formed on the cylindrical protruding portion 40 of the second sealing member 26 is brought into contact with the retaining protrusions 46 formed on the inner peripheral surface of the cylindrical mounted part 24A of the first sealing member 24 (see FIG. 5). At this time, the end protrusion 50 is pressed inward in radial directions by the retaining protrusions 46, which causes the cylindrical protruding portion 40 to bend inward. The end protrusion 50 of the cylindrical protruding portion 40 easily passes over the retaining protrusions 46. Therefore, the first sealing member 24 and the second sealing member 26 can be easily combined.

As shown in FIGS. 3, 5, and 6, each retaining protrusions 46 has a first inclined surface 46A located opposite to the annular part 24B and a second inclined surface 46B located closer to the annular part 24B. The first inclined surface 46A and the second inclined surface 46B are connected with a curved surface, so that each retaining protrusions 46 has a substantially triangular contour with a curved top when viewed from lateral side.

When the sealing device 21 is assembled by combining the first sealing member 24 and the second sealing member 26, as shown in FIG. 5, the end protrusion 50 formed on the cylindrical protruding portion 40 of the second sealing member 26 is brought into contact with the first inclined surfaces 46A of the retaining protrusions 46 formed on the inner peripheral surface of the cylindrical mounted part 24A of the first sealing member 24. If the inclination angle α (see FIG. 6A) of the first inclined surfaces 46A is too large, the resistance force of the retaining protrusions 46 will be large, and the retaining protrusions 46 and/or the end protrusion 50 may be damaged. Accordingly, the inclination angle α of the first inclined surfaces 46A of the retaining protrusions 46 relative to a cylinder centered on the axis of the sealing device 21 is preferably 60 degrees or less. If the inclination angle α of the first inclined surfaces 46A of the retaining protrusions 46 is 60 degrees or less, the end protrusion 50 of the cylindrical protruding portion 40 easily passes over the retaining protrusions 46, and thus, the first sealing member 24 and the second sealing member 26 can be combined easily.

Once the end protrusion 50 of the cylindrical protruding portion 40 passes over the retaining protrusions 46 and the retaining projections 46 is fitted into the circumferential groove 48, it is preferable that the second sealing member 26 be not easily separated from the first sealing member 24. If the inclination angle θ (see FIG. 6A) of the second inclined surfaces 46B of the retaining protrusions 46 is too small, the end projection 50 may come off the retaining protrusions 46 and the second sealing member 26 may separate from the first sealing member 24. Accordingly, the inclination angle of the second inclined surfaces 46B of the retaining protrusions 46 relative to the cylinder centered on the axis of the sealing device 21 is preferably 45 degrees or more. If the inclination angle of the second inclined surfaces 46B of the retaining protrusions 46 is 45 degrees or more, once the end protrusion 50 of the cylindrical protruding portion 40 passes over the retaining protrusion 46 and the retaining projections 46 is fitted into the circumferential groove 48, the end protrusion 50 is hooked by the retaining protrusions 46, so that separation of the sealing members 24 and 26 is restricted.

Figure 6B:
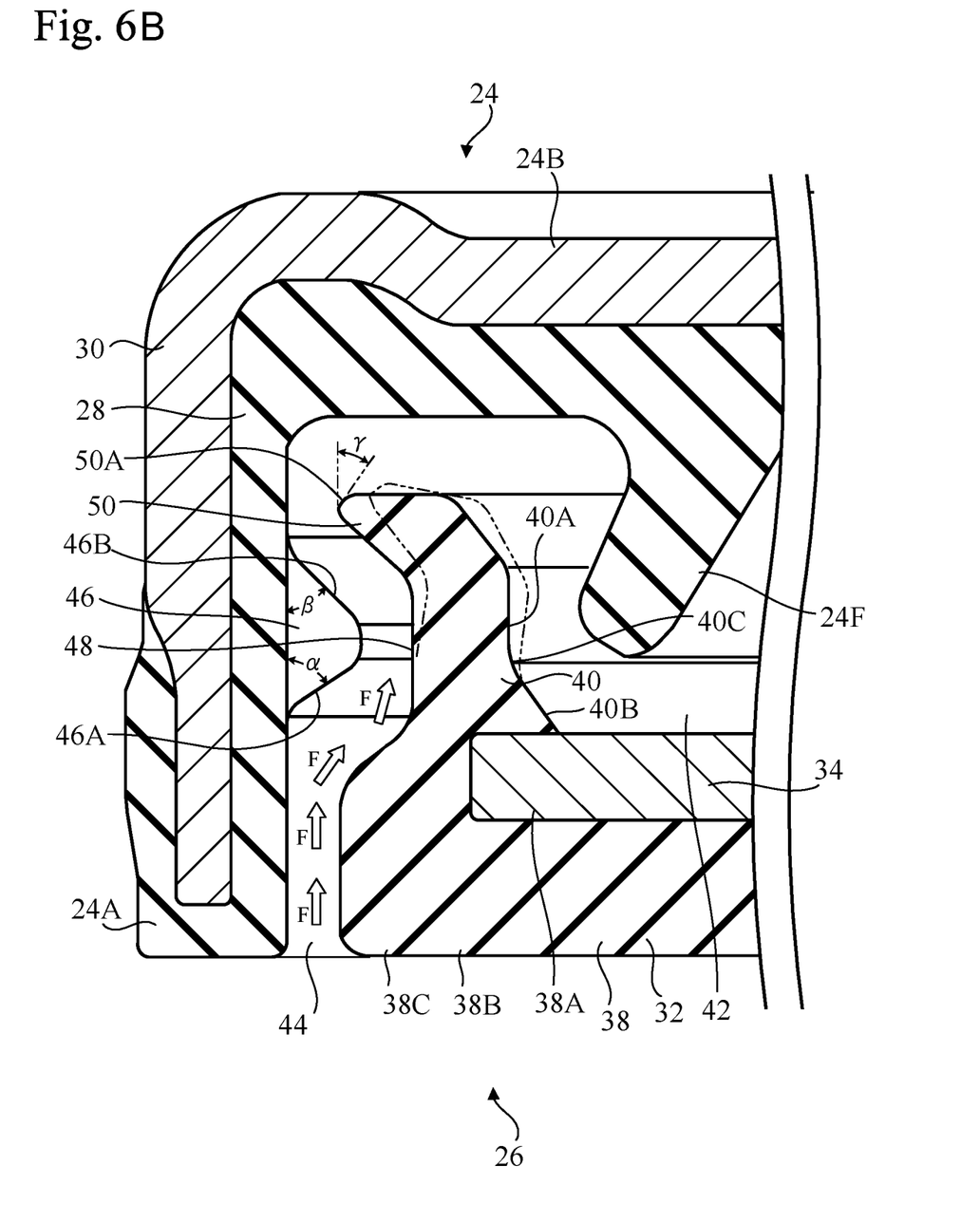
FIG. 6B is a partial enlarged cross-sectional view of the sealing device according to a modified embodiment

As shown in FIGS. 5 and 6B, the outer edge of the end protrusion 50 of the cylindrical protruding portion 40 has a third inclined surface 50A located on the opposite side of the flange 38. The inclination angle γ (see FIG. 6 B) of the third inclined surface 50A of the end protrusion 50 relative to a cylinder centered on the axis of the sealing device 21 is preferably less than or equal to the inclination angle α of the first inclined surfaces 46A relative to a cylinder centered on the axis of the sealing device 21.

When the first sealing member 24 and the second sealing member 26 are combined to assemble the sealing device 21, the third inclined surface 50A of the end protrusion 50 formed on the cylindrical protruding portion 40 of the second sealing member 26 is brought into contact with the first inclined surfaces 46A of the retaining protrusions 46 formed on the inner peripheral surface of the cylindrical mounted part 24A of the first sealing member 24. If the inclination angle γ of the third inclined surface 50A of the end protrusion 50 is too large, the resistance force of the retaining protrusions 46 will be large, and the retaining protrusions 46 and/or the end protrusion 50 may be damaged. On the other hand, if the inclination angle γ of the third inclined surface 50A of the end protrusion 50 is less than or equal to the inclination angle α of the first inclined surfaces 46A of the retaining protrusion 46, when the third inclined surface 50A is brought into contact with the first inclined surfaces 46A, the end protrusion 50 is likely to elastically deform radially inward. Therefore, the end protrusion 50 of the cylindrical protruding portion 40 easily passes over the retaining protrusions 46. Therefore, the first sealing member 24 and the second sealing member 26 can be easily combined.

The outer peripheral edge of the end protrusion 50 is preferably formed in an arc shape having a radius of curvature R (see FIG. 6A) of 0.1 mm or more. If it is formed in an arc shape having a radius of curvature R of 0.1 mm or more, when the outer edge of the end protrusion 50 is brought into contact with the first inclined surfaces 46A of the retaining protrusion 46, the end protrusion 50 is less likely to damage the retaining protrusions.

As shown in FIGS. 2 and 6, when the sealing device 21 is in use, the cylindrical protruding portion 40 is not in contact with the annular part 24B of the first sealing member 24. As similar to the labyrinth lip 24F, the cylindrical protruding portion 40 complicates the internal shape of the space 42 between the annular part 24B of the first sealing member 24 and the flange 38 of the second sealing member 26, making it difficult for foreign matter to enter toward the side lip 24E located radially inside the lip 24F.

If the distance between the annular part 24B of the first sealing member 24 and the flange 38 of the second sealing member 26 is reduced when the sealing device 21 is not in use, the cylindrical protruding portion 40 is in contact with the annular part 24B and the labyrinth lip 24F is in contact with the flange 38. The dimensions of the circumferential groove 48 and the retaining protrusions 46 are designed to allow for such a change in the interval between the seal members 24 and 26.

Figure 8:
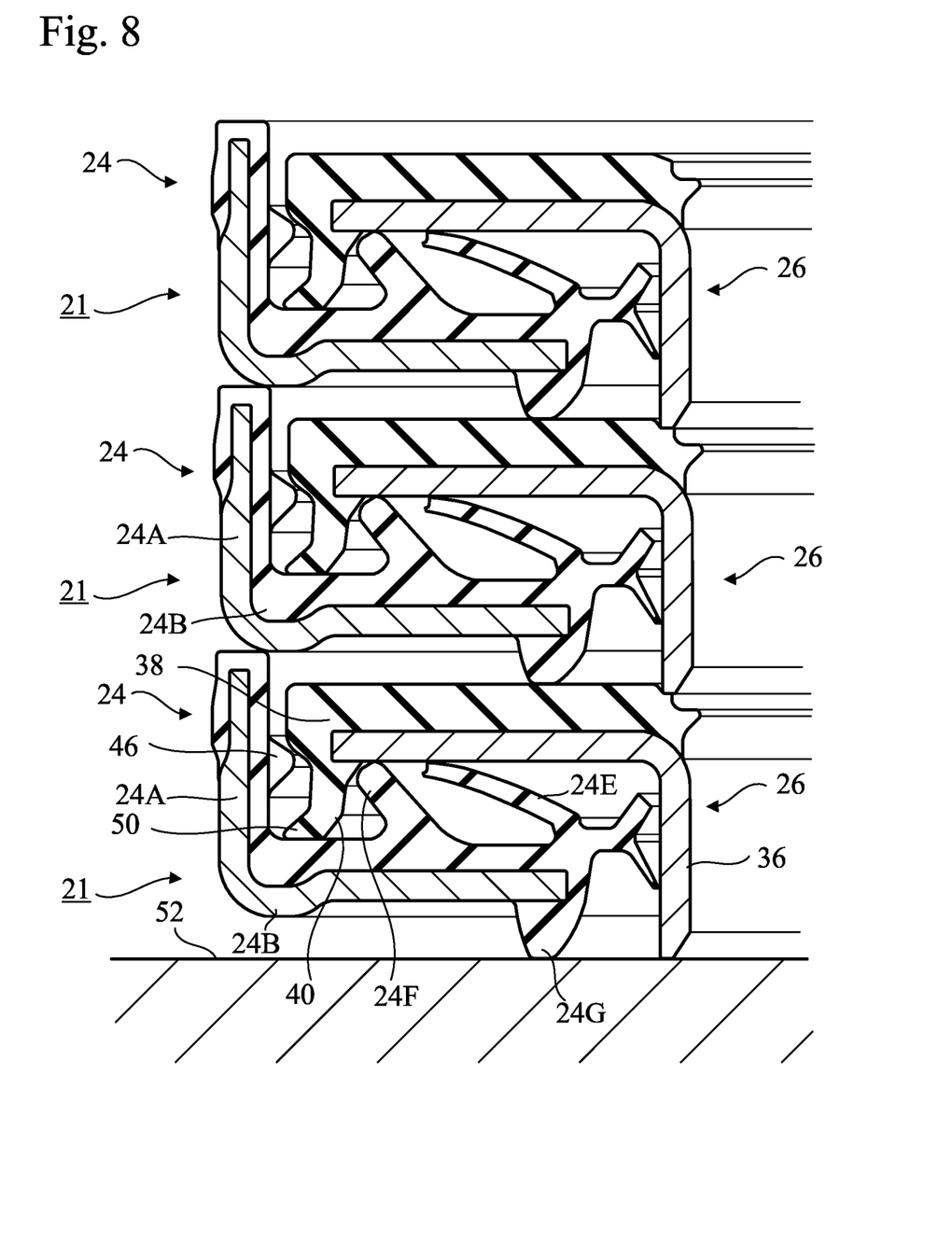
FIG. 8 is a cross-sectional view of sealing devices according to the embodiment when stacked.

FIG. 8 shows stacked sealing devices 21. The cylindrical protrusion 24G and the sleeve 36 of the lowest sealing device 21 are in contact with the planar surface 52. The cylindrical protrusion 24G and the sleeve 36 of the second-lowest sealing device 21 are in contact with the flange 38 of the lowest sealing device 21, and the annular part 24B of the first sealing member 24 of the second-lowest sealing device 21 is in contact with the cylindrical mounted part 24A of the first sealing member 24 of the lowest sealing device 21. The cylindrical protrusion 24G and the sleeve 36 of the third-lowest sealing device 21 are in contact with the flange 38 of the second-lowest sealing device 21, and the annular part 24B of the first sealing member 24 of the third-lowest sealing device 21 is in contact with the cylindrical mounted part 24A of the first sealing member 24 of the second-lowest sealing device 21.

As shown in FIG. 8, with the first sealing member 24 and the second sealing member 26 combined in each sealing device 21, multiple sealing devices 21 are stacked, so that the distance between the annular part 24B of the first sealing member 24 and the flange 38 of the second sealing member 26 is reduced in each sealing device 21. In this case, the side lip 24E, which has a small thickness, undergoes large elastic deformation under the upper load. However, since the cylindrical protruding portion 40 of the second sealing member 26 is in contact with the annular part 24B of the first sealing member 24, and the labyrinth lip 24F of the first sealing member 24 is in contact with the flange 38 of the second sealing member 26, the lower sealing device 21 can stably support the upper sealing device 21.

Figure 9:
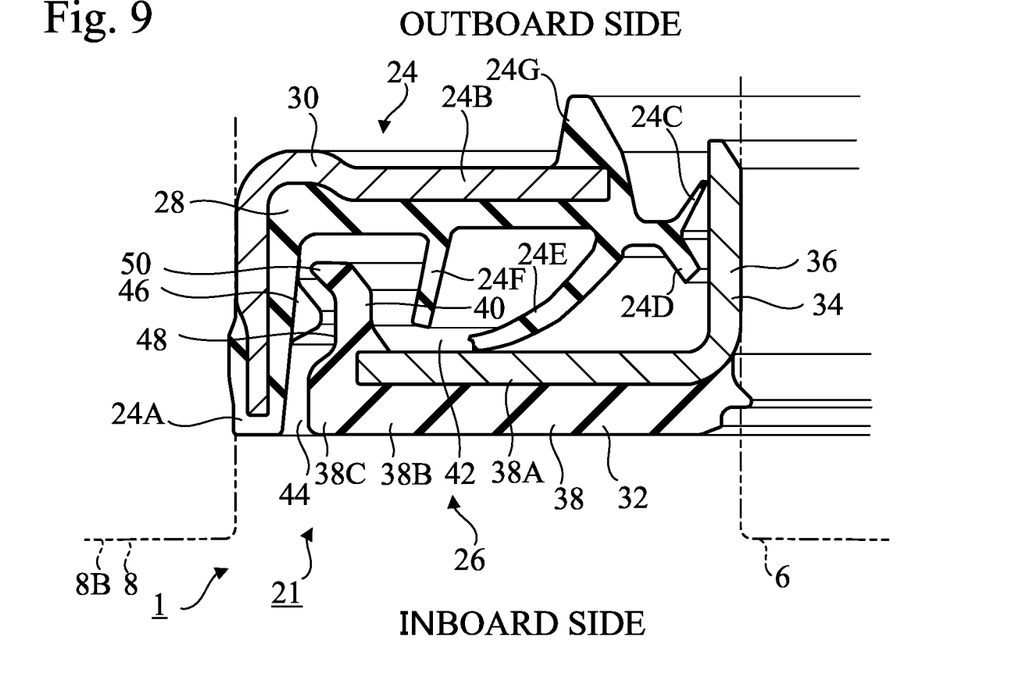
FIG. 9 is a partial cross-sectional view of a sealing device according to another modification of the embodiment.

FIG. 9 shows a sealing device 21 according to another modification of the embodiment. In this modification, the inner peripheral surface of the cylindrical mounted part 24A of the first sealing member 24 is not cylindrical, but is of a truncated cone shape having a diameter that increases toward the inboard side. Therefore, foreign matter is easily discharged along the truncated conical inner peripheral surface of the cylindrical mounted part 24A and through the annular clearance 44.

In this modification, the thickness of the labyrinth lip 24F is less than the thickness of the labyrinth lip 24F of the embodiment shown in FIG. 2. However, with the first sealing member 24 and the second sealing member 26 combined in each sealing device 21, multiple sealing devices 2 are stacked, the cylindrical protruding portion 40, the labyrinth lip 24F, and the side lip 24E can stably support the upper load.

Figure 10:
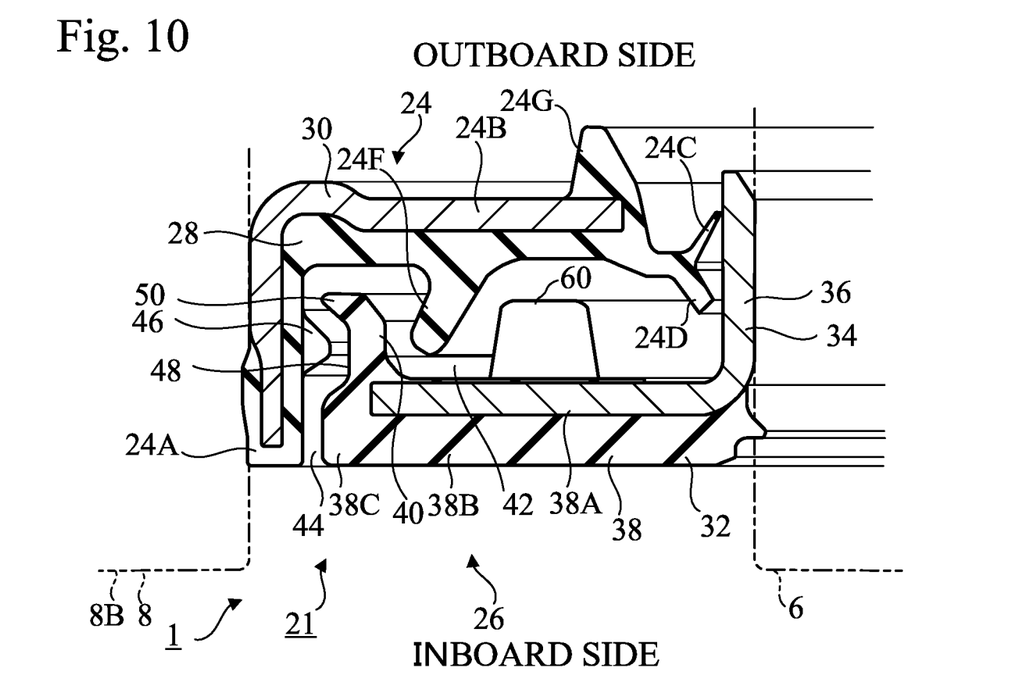
FIG. 10 is a partial cross-sectional view of a sealing device according to another modification of an embodiment.

FIG. 10 shows a sealing device 21 according to another modification of the embodiment. In this modification, the first sealing member 24 is not provided with side lip 24E, and the second sealing member 26 has multiple water-discharge protrusions or fins 60. The water-discharge protrusions 60 are supported by the flange 38 and are arranged at equal angular intervals in the circumferential direction. The water-discharge protrusions 60 protrude in the space 42 toward the annular part 24B of the first sealing member 24.

The water-discharge protrusions 60 are part of the elastic ring 32 of the second sealing member 26 and are connected to the surface on the side of the sleeve 36 (outboard side surface) of the flange rigid portion 38A. Therefore, the water-discharge protrusions 60 is formed from the same material as that of the elastic ring 32, i.e., an elastomer material containing a magnetic metal powder and a ceramic powder.

When the inner race 6 rotates, the water-discharge protrusions 60 of the second sealing member 26 rotates together with the inner race 6 and deflects foreign matter, such as water, in the space 42. The deflected foreign matter passes through the clearance between the labyrinth lip 24F and the cylindrical protruding portion 40, and is finally discharged outside through the annular clearance 44.

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above-described embodiment, the hub 4 and the inner race 6, which are inner members, are rotatable members, while the outer race 8, which is an outer member, is a stationary member. However, the present invention is not limited thereto, and may be configured such that multiple sealed members rotate relative to each other. For example, inner members may be stationary while an outer member may be rotatable, or all of the members may be rotatable. In a case in which the outer race 8 rotates, it is preferable to fix the water-discharge protrusions 60 (see FIG. 10) to the first sealing member 24 that rotates together with the outer race 8.

The use of the present invention is not limited to sealing the hub bearing 1. For example, the sealing device or the sealing structure according to the present invention may be applied to a differential gear mechanism or other power transmission mechanism of an automotive vehicle, to a bearing or other support mechanism for a drive shaft of an automotive vehicle, or to a bearing or other support mechanism of a rotary shaft of a pump.

The above embodiment and modifications may be combined as long as no contradiction arises thereby.

Aspects of the present invention are also set out in the following numbered clauses:

Clause 1. A sealing device disposed between an inner member and an outer member that rotate relative to each other, the sealing device acting to seal a gap between the inner member and the outer member, the sealing device comprising:
  a first sealing member comprising a cylindrical mounted part adapted to be mounted to the outer member, and an annular part extending radially inward from the cylindrical mounted part toward the inner member; and
  a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member,
  the cylindrical mounted part of the first sealing member comprising an inner peripheral surface on which multiple retaining protrusions made from an elastic material are formed circumferentially, the retaining protrusions being arranged at intervals in a circumferential direction,
  the cylindrical protruding portion of the second sealing member comprising an outer peripheral surface on which a circumferential groove extending continuously in a circumferential direction is formed, the multiple retaining protrusions of the first sealing member being placed within the circumferential groove,
  the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction.

Clause 2. The sealing device according to clause 1, wherein a circular annular clearance is provided between the cylindrical mounted part of the first sealing member and an outer edge of the flange of the second sealing member,
  the retaining protrusion of the first sealing member and the circumferential groove of the second sealing member being located closer to the annular part of the first sealing member than the annular clearance,
  the circumferential groove of the second sealing member being formed radially inside the annular clearance.

According to this clause, when the inner member rotates, the second sealing member mounted on the inner member also rotates, and foreign matter that has entered the circumferential groove formed on the outer peripheral surface of the cylindrical protruding portion of the second sealing member is blown out. Since the circumferential groove is formed radially inside the annular clearance, foreign matter blown out from the circumferential groove can pass through the annular clearance to the outside of the sealing device easily.

Clause 3. The sealing device according to clause 1 or 2, wherein the end portion opposite to the flange of the cylindrical protruding portion including the end protrusion is formed only from the elastic material.

When assembling the sealing device by combining the first sealing member and the second sealing member, the end protrusion formed on the cylindrical protruding portion of the second sealing member is brought into contact with the retaining protrusions formed on the inner peripheral surface of the cylindrical mounted part of the first sealing member. According to this clause, the end protrusion and the end portion of the cylindrical protruding portion disposed radially inside the end protrusion is constituted of only an elastic material and is not reinforced with a rigid material. Therefore, the cylindrical protruding portion is flexible and the end protrusion of the cylindrical protruding portion easily passes over the retaining protrusions. Accordingly, the first sealing member and the second sealing member can be easily combined.

Clause 4. The sealing device according to any one of clauses 1 to 3, wherein the inner peripheral surface of the cylindrical protruding portion comprises a cylindrical surface and a truncated conical surface adjacent to the cylindrical surface, the truncated conical surface being located closer to the flange than the cylindrical surface, the truncated conical surface has a diameter that decreases increases as a distance from the flange increases.

When the first sealing member and the second sealing member are combined to assemble the sealing device, the end protrusion formed on the cylindrical protruding portion of the second sealing member is brought into contact with the retaining protrusions formed on the inner peripheral surface of the cylindrical mounted part of the first sealing member. According to this clause, the cylindrical protruding portion is likely to be bent near the boundary between the truncated conical surface located closer to the flange and the cylindrical surface located farther from the flange, so that the end protrusion the cylindrical protruding portion easily passes over the retaining protrusions. Therefore, the first sealing member and the second sealing member can be easily combined.

Clause 5. The sealing device according to any one of clauses 1 to 4, wherein each retaining protrusion comprises a first inclined surface located opposite to the annular part, the first inclined surface has an inclination angle relative to a cylinder centered on an axis of the sealing device being less than or equal to 60 degrees.

When the sealing device is assembled by combining the first sealing member and the second sealing member, the end protrusion formed on the cylindrical protruding portion of the second sealing member is brought into contact with the retaining protrusions formed on the inner peripheral surface of the cylindrical mounted part of the first sealing member. According to this clause, since the inclination angle of the first inclined surfaces of the retaining protrusions is 60 degrees or less, the end protrusion of the cylindrical protruding portion easily passes over the retaining protrusions, and thus, the first sealing member and the second sealing member can be combined easily.

Clause 6. The sealing device according to any one of clauses 1 to 5, wherein each retaining protrusion comprises a second inclined surface located closer to the annular part, the second inclined surface has an inclination angle relative to a cylinder centered on an axis of the sealing device being greater than or equal to 45 degrees.

According to this clause, since the inclination angle of the second inclined surfaces of the retaining protrusions is 45 degrees or more, once the end protrusion of the cylindrical protruding portion passes over the retaining protrusion and the retaining projections is fitted into the circumferential groove, the end protrusion is hooked by the retaining protrusions, so that separation of the sealing members is restricted.

Clause 7. The sealing device according to any one of clauses 1 to 6, wherein each retaining protrusion comprises a first inclined surface located opposite to the annular part,
  the end protrusion of the cylindrical protruding portion comprising an outer edge comprising a third inclined surface located on an opposite side of the flange,
  the third inclined surface of the end protrusion has an inclination angle relative to a cylinder centered on an axis of the sealing device being less than or equal to an inclination angle of the first inclined surface relative to a cylinder centered on the axis of the sealing device.

When the first sealing member and the second sealing member are combined to assemble the sealing device, the third inclined surface of the end protrusion formed on the cylindrical protruding portion of the second sealing member is brought into contact with the first inclined surfaces of the retaining protrusions formed on the inner peripheral surface of the cylindrical mounted part of the first sealing member. According to this clause, since the inclination angle of the third inclined surface of the end protrusion is less than or equal to the inclination angle of the first inclined surfaces of the retaining protrusion, when the third inclined surface is brought into contact with the first inclined surfaces, the end protrusion is likely to elastically deform radially inward. Therefore, the end protrusion of the cylindrical protruding portion easily passes over the retaining protrusions. Therefore, the first sealing member and the second sealing member can be easily combined.

Clause 8. The sealing device according to any one of clauses 1 to 7, wherein the end protrusion of the cylindrical protruding portion comprises an outer peripheral edge formed in an arc shape having a radius of curvature of 0.1 mm or more.

When the sealing device is assembled by combining the first sealing member and the second sealing member, the outer peripheral edge of the end protrusion formed on the cylindrical protruding portion of the second sealing member is brought into contact with the retaining protrusions formed on the inner peripheral surface of the cylindrical mounted part of the first sealing member. According to this clause, since the outer peripheral edge of end protrusion is formed in an arc shape having a radius of curvature of 0.1 mm or more, the end protrusion is less likely to damage the retaining protrusions.

Clause 9. The sealing device according to any one of clauses 1 to 8, wherein the first sealing member has an annular labyrinth lip that protrudes from the annular part toward the flange of the second sealing member and that is not in contact with the flange when the sealing device is used,
  the labyrinth lip being located radially inside the cylindrical protruding portion of the second sealing member,
  the cylindrical protruding portion being not in contact with the annular part of the first sealing member when the sealing device is used,
  the cylindrical protruding portion being in contact with the annular part and the labyrinth lip being in contact with the flange if a distance between the annular part of the first sealing member and the flange of the second sealing member is reduced when the sealing device is not used.

According to this clause, the internal shape of the space between the annular part of the first sealing member and the flange of the second sealing member is complicated by the labyrinth lip disposed radially inside the cylindrical protruding portion, making it difficult for foreign matter to enter the inside of the bearing to be sealed. In addition, with the first sealing member and the second sealing member combined in each sealing device, when multiple sealing devices are stacked, the distance between the annular part of the first sealing member and the flange of the second sealing member is reduced in each sealing device. In this case, since the cylindrical protruding portion of the second sealing member is in contact with the annular part of the first sealing member and the labyrinth lip of the first sealing member is in contact with the flange of the second sealing member, the lower sealing device can stably support the upper sealing device.

REFERENCE SYMBOLS

1: Hub bearing
6: Inner race (inner member)

8: Outer race (outer member)
21: Sealing device
24: First sealing member
24A: Cylindrical mounted part
24B: Annular part
24C: Grease lip
24D: Dust lip
24E: Side lip
24F: Labyrinth lip
24G: Cylindrical protrusion
26: Second sealing member
36: Sleeve
38: Flange
38A: Flange rigid portion
38B: Flange elastic portion
38C: Outer edge
40: Cylindrical protruding portion
42: Space
44: Annular clearance
46: Retaining projection
46A: First inclined surface
46B: Second inclined surface
48: Circumferential groove
50: End protrusion
52: Planar surface
60: Water-discharge protrusion

The invention claimed is:

1. A sealing device disposed between an inner member and an outer member that rotate relative to each other, the sealing device acting to seal a gap between the inner member and the outer member, the sealing device comprising:
   a first sealing member comprising a cylindrical mounted part adapted to be mounted to the outer member, and an annular part extending radially inward from the cylindrical mounted part toward the inner member, and
   a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member,
   the cylindrical mounted part of the first sealing member comprising an inner peripheral surface on which multiple retaining protrusions made from an elastic material are formed circumferentially, the multiple retaining protrusions being arranged at intervals in a circumferential direction,
   the cylindrical protruding portion of the second sealing member comprising an outer peripheral surface on which a circumferential groove extending continuously in a circumferential direction is formed, the multiple retaining protrusions of the first sealing member being placed within the circumferential groove,
   the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction, and
   wherein an inner peripheral surface of the cylindrical protruding portion comprises a cylindrical surface and a truncated conical surface adjacent to the cylindrical surface, the truncated conical surface being located closer to the flange than the cylindrical surface, the truncated conical surface has a diameter that increases as a distance from the flange increases.

2. A sealing device disposed between an inner member and an outer member that rotate relative to each other, the sealing device acting to seal a gap between the inner member and the outer member, the sealing device comprising:
   a first sealing member comprising a cylindrical mounted part adapted to be mounted to the outer member, and an annular part extending radially inward from the cylindrical mounted part toward the inner member, and
   a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member,
   the cylindrical mounted part of the first sealing member comprising an inner peripheral surface on which multiple retaining protrusions made from an elastic material are formed circumferentially, the multiple retaining protrusions being arranged at intervals in a circumferential direction,
   the cylindrical protruding portion of the second sealing member comprising an outer peripheral surface on which a circumferential groove extending continuously in a circumferential direction is formed, the multiple retaining protrusions of the first sealing member being placed within the circumferential groove,
   the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction, and
   wherein each of the multiple retaining protrusions comprises a first inclined surface located opposite to the annular part,
   the end protrusion of the cylindrical protruding portion comprising an outer edge comprising a third inclined surface located on an opposite side of the flange,
   the third inclined surface of the end protrusion has an inclination angle relative to a cylinder centered on an axis of the sealing device being less than or equal to an inclination angle of the first inclined surface relative to a cylinder centered on the axis of the sealing device.

3. A sealing device disposed between an inner member and an outer member that rotate relative to each other, the sealing device acting to seal a gap between the inner member and the outer member, the sealing device comprising:
   a first sealing member comprising a cylindrical mounted part adapted to be mounted to the outer member, and an annular part extending radially inward from the cylindrical mounted part toward the inner member; and
   a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member,
   the cylindrical mounted part of the first sealing member comprising an inner peripheral surface on which multiple retaining protrusions made from an elastic material are formed circumferentially, the multiple retaining protrusions being arranged at intervals in a circumferential direction, the cylindrical protruding portion of the second sealing member comprising an outer peripheral surface on which a circumferential groove extending continuously in a circumferential direction is formed, the multiple retaining protrusions of the first sealing member being placed within the circumferential groove, the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction, and wherein the first sealing member has an annular labyrinth lip that protrudes from the annular part toward the flange of the second sealing member and is not in contact with the flange, the labyrinth lip being located radially inside the cylindrical protruding portion of the second sealing member, the cylindrical protruding portion being not in contact with the annular part of the first sealing member, and wherein an axial projecting length of the labyrinth lip from the annular part is the same as an axial projecting length of the cylindrical protruding portion from the flange.

4. A sealing device disposed between an inner member and an outer member that rotate relative to each other, the sealing device acting to seal a gap between the inner member and the outer member, the sealing device comprising:

a first sealing member comprising a cylindrical mounted part adapted to be mounted to the outer member, and an annular part extending radially inward from the cylindrical mounted part toward the inner member, and a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member, the cylindrical mounted part of the first sealing member comprising an inner peripheral surface on which multiple retaining protrusions made from an elastic material are formed circumferentially, the multiple retaining protrusions being arranged at intervals in a circumferential direction, the cylindrical protruding portion of the second sealing member comprising an outer peripheral surface on which a circumferential groove extending continuously in a circumferential direction is formed, the multiple retaining protrusions of the first sealing member being placed within the circumferential groove, the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction, and wherein each of the multiple retaining protrusions comprises a first inclined surface located opposite to the annular part, the first inclined surface has an inclination angle relative to a cylinder centered on an axis of the sealing device being less than or equal to 60 degrees.

5. The sealing device according to claim 4, wherein each of the multiple retaining protrusions comprises a second inclined surface located opposite to the first inclined surface, wherein the second inclined surface has an inclination angle relative to a cylinder centered on an axis of the sealing device being greater than or equal to 45 degrees.

6. A sealing device disposed between an inner member and an outer member that rotate relative to each other, the sealing device acting to seal a gap between the inner member and the outer member, the sealing device comprising:

a first sealing member comprising a cylindrical mounted part adapted to be mounted to the outer member, and an annular part extending radially inward from the cylindrical mounted part toward the inner member; and a second sealing member comprising a sleeve adapted to be mounted to the inner member, a flange extending radially outward from the sleeve and facing the annular part of the first sealing member, and a cylindrical protruding portion made from an elastic material extending along an axial direction from the flange and disposed radially inside the cylindrical mounted part of the first sealing member, the cylindrical mounted part of the first sealing member comprising an inner peripheral surface on which multiple retaining protrusions made from an elastic material are formed circumferentially, the multiple retaining protrusions being arranged at intervals in a circumferential direction, the cylindrical protruding portion of the second sealing member comprising an outer peripheral surface on which a circumferential groove extending continuously in a circumferential direction is formed, the multiple retaining protrusions of the first sealing member being placed within the circumferential groove, the cylindrical protruding portion of the second sealing member comprising an end portion opposite to the flange, the end portion comprising an outer peripheral edge comprising an end protrusion protruding radially further outward than the circumferential groove, the end protrusion extending continuously in a circumferential direction, and wherein the end protrusion of the cylindrical protruding portion comprises an outer peripheral edge formed in an arc shape having a radius of curvature of 0.1 mm or more.

* * * * *